Feb. 14, 1939.　　　F. P. PERKINS　　　2,147,055
HANDLING APPARATUS
Filed Oct. 28, 1935　　　2 Sheets-Sheet 2
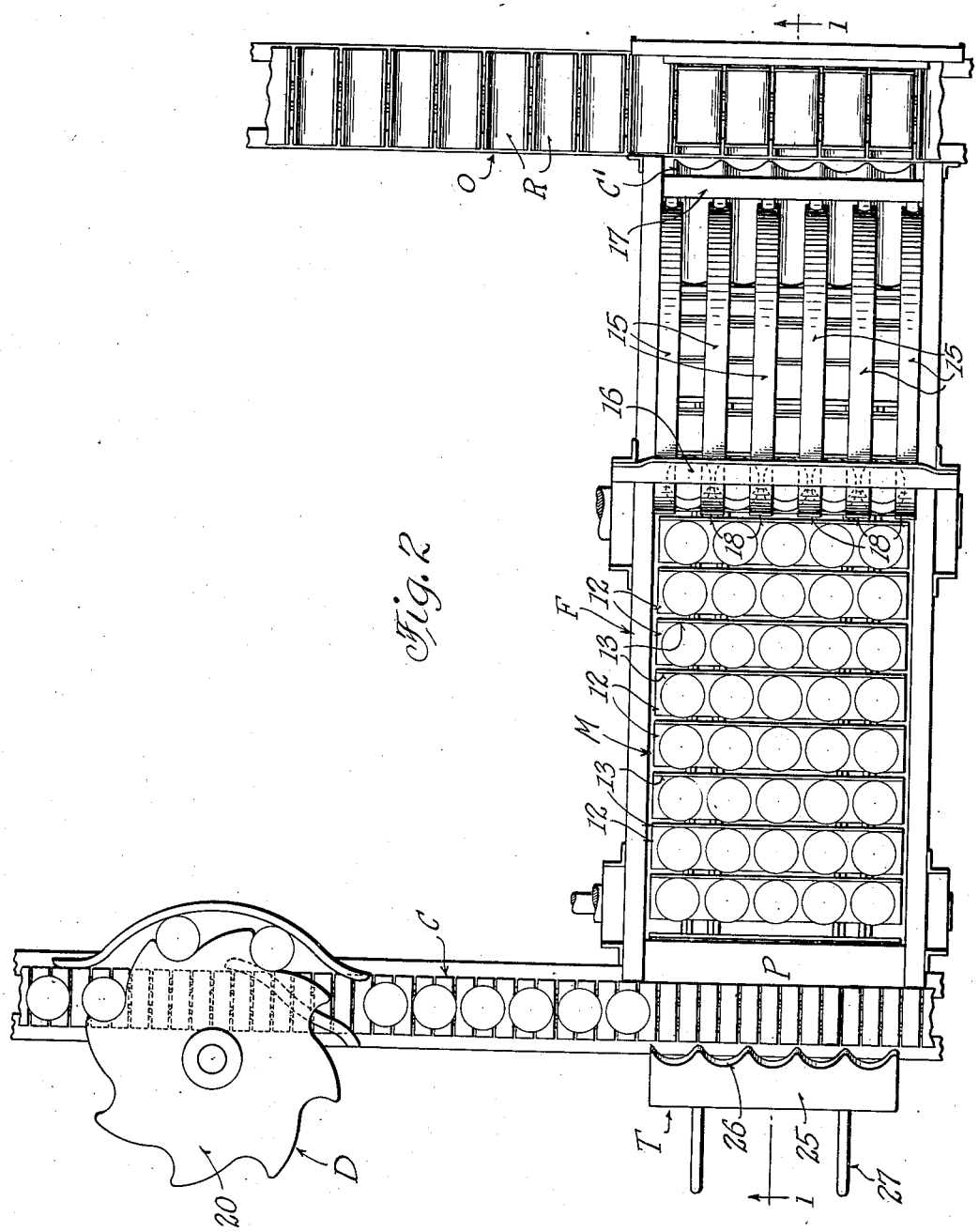
INVENTOR.
Frank P. Perkins
BY
Cotton, Hudnall, Lesher,
McNamara & Michael
ATTORNEY.

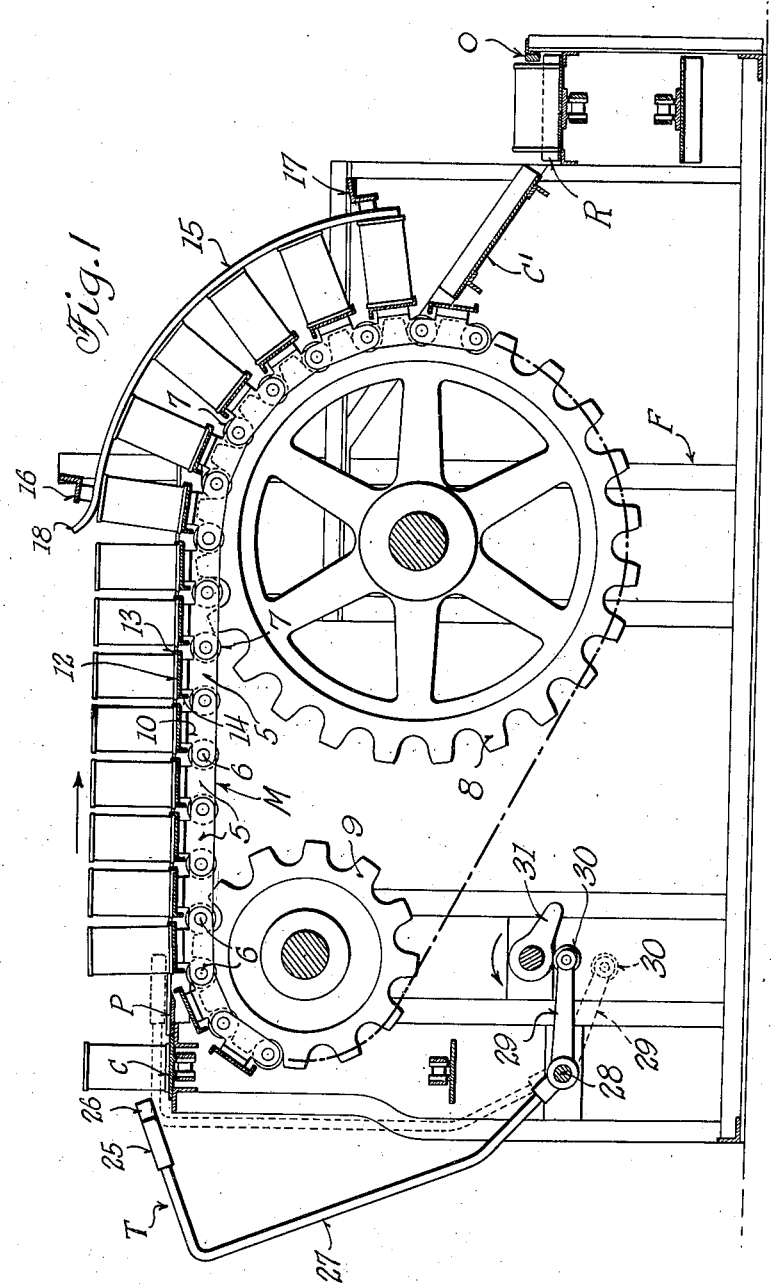

Patented Feb. 14, 1939

2,147,055

UNITED STATES PATENT OFFICE 2,147,055

HANDLING APPARATUS

Frank P. Perkins, Waukesha, Wis., assignor to Michael Yundt Company, Waukesha, Wis., a corporation of Wisconsin Application October 28, 1935, Serial No. 46,970

4 Claims. (Cl. 198—31)

This invention relates to an improvement in handling apparatus and especially designed and adapted for use in handling cans or similar containers, as, for example, in handling canned beer during progress of the same through a pasteurizing apparatus.

One of the principal objects of the invention is to provide an apparatus of this character which so handles the cans as to maintain them in properly spaced though closely adjacent relation throughout their progress through the machine thereby insuring effective heat interchanging contact between the pasteurizing liquid and substantially all portions of the cans.

Another object of the invention is to provide for the draining from the tops of the cans of any pasteurizing liquid that may have accumulated therein, this function being performed automatically at the discharge end of the machine.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view partly in side elevation and partly in central longitudinal vertical section showing a handling apparatus embodying the present invention; and Figure 2 is a fragmentary plan view of the machine shown in Figure 1.

It should be understood that the handling apparatus embodying the present invention is designed for use with pasteurizing machinery. One type of such pasteurizing machine is fully shown and described in my pending application for Conveying machinery, filed September 1, 1933, Serial No. 687,814, Patent 2,131,816 issued Oct. 4, 1938.

Referring to the drawings, it will be seen that the present invention comprises a suitable frame designated generally at F and which may be of any suitable construction. Mounted on the frame is an endless main conveyor designated generally at M. While the articles are on the main conveyor they are subjected to treatment with the pasteurizing liquid by any suitable means (not shown). The cans are supplied to the main conveyor from a supply or feed conveyor C which has associated therewith a spacing device D and transfer means T for effecting transfer of the cans from the feed conveyor to the main conveyor. At the discharge end of the main conveyor, chutes C' are provided which convey the cans to an offtake conveyor designated generally at O.

The main conveyor M comprise a suitable number of endless chains 5. Preferably, a plurality of such chains are provided. The links 50 of the chains are interconnected by pivot pins 6 and the pivot pins 6 are provided with rollers 7 to adapt the chains to intermesh with the teeth of the driving and idler sprockets designated at 8 and 9. Each link 5 is provided with an integral angularly disposed lug 10 which adapts the links of alined chains for convenient connection with plate-like conveyor elements 12. Each conveyor element 12 has its transverse edges provided with oppositely directed flanges designated at 13 and 14.

The sprocket 8 at the discharge end of the conveyor is preferably of considerable size so that as the cans move down to the discharge chutes C' they move through an arcuate path of considerable extent. During such time they are held against the plates 12 and the flanges 13 by means of retaining strips 15 adjustably secured to their carrier bars 16 and 17 in any suitable manner. As will be seen from Figure 2, a plurality of these strips 15 are provided and they overlie the discharge end of the conveyor in concentric relation to the axis of the sprocket wheel 8 and are disposed in spaced parallel relation to each other. Adjacent their ends they are secured to carrier bars 16 and 17 which may be suitably secured and preferably adjustably secured to the frame F. The upper ends of the strips 15 may be upturned as at 18 to facilitate passage of the cans thereunder. During the cans' travel under the strips they are free to move with the conveyor but may not fall away from their plates 12 or depart from their right angular relation thereto until they clear the lower end of the strips and by this time any water that may have been trapped between the upper rim of the can and the top thereof will have spilt over the rim. Furthermore, the cans are prevented from becoming tangled or mixed and consequently jamming and are maintained in position to be received by the chutes C' and conveyed thereby to the receivers R of the offtake conveyor O.

For the purpose of supplying the cans in properly spaced relation to the plate-like elements 12 of the main conveyor, the spacing device D is associated with the feed conveyor C as above indicated. This device includes a notched spacing disc 20 and may be constructed and operated in the manner fully disclosed in my pending application above referred to.

Between the feed conveyor C and the main conveyor M is a fixed bridge plate P suitably secured to members of the frame F.

For transferring the cans while in properly spaced relation from the feed conveyor across the bridge plate P to the main conveyor a pusher bar 25 is provided and has one edge provided with can receiving notches 26 which coact with the cans when the pusher bar is swung to the right as viewed in Figures 1 and 2 to move the cans across the bridge plate P while maintaining their proper spaced relation. The pusher bar 26 is secured to the upper ends of angularly shaped rods 27 fixed to a rock shaft 28. The rock shaft 28 has an arm 29 secured thereto and provided with a roller 30 coacting with an operating cam 31 actuated in synchronism with the conveyors to operate the pusher bar 25 at the proper time.

It is preferable that retaining strips 15 be so spaced relative to each other and to notches 26 on the pusher bar 25 that the peaks between the notches are substantially in alignment with a respective strip 15. With this relationship each of the cans of the respective longitudinal row will contact adjacent strips as the cans move through the arcuate path at the discharge end as is indicated in Figure 2. The central portion of the top of the cans is thereby positioned to ride in between the adjacent strips and the spacing between the strips provides means permitting ready discharge of any water trapped in the top of the can as the can swings from vertical to substantially horizontal position in its movement about the discharge end.

With an apparatus of the character described, the cans are fed in properly spaced relation transversely to the main conveyor. On the main conveyor this transverse spacing is maintained and furthermore proper longitudinal spacing is insured by the provision of the flanges 13. Thus, effective pasteurizing action is insured. Finally, at the discharge end of the machine the cans are automatically relieved of excess water and are delivered in an orderly, proper fashion to the offtake conveyor.

While I have shown and described one construction in which the invention may be advantageously embodied, it is to be understood that this construction has been selected merely for the purpose of illustration or example, and that various changes in the size, shape and arrangement of the parts may be made without departing from the spirit of the invention or the scope of the subjoined claims.

The invention claimed is:

1. An apparatus of the character described comprising a conveyor consisting of driving and idler sprockets, endless chains trained around said sprockets, transverse plate-like conveyor elements secured to the links of said chains and provided with upwardly extending edge flanges to maintain articles thereon in proper spaced relation longitudinally of the conveyor, and curved retaining strips concentric with one of said sprockets and spaced to the adjacent portions of the endless chains and cooperable with articles carried on the conveyor to retain the articles in position as they move downwardly around one of the sprockets.

2. An apparatus of the character described comprising a conveyor including sprocket wheels, an endless flexible element trained about said sprocket wheels, plate-like conveyor elements secured to said endless elements and extending transversely thereof, flanges on edges of the plate-like conveyor elements and retainer strips concentric with one of the sprockets and spaced from the conveyor and cooperable with the edge flanges to retain articles on the conveyor supported on the plate-like elements while tilted with respect to the horizontal.

3. An apparatus of the character described comprising an endless conveyor trained around sprockets at each end thereof, a pusher bar provided with a series of notches and intermediate peaks, said pusher bar adapted to push articles onto one end of said conveyor in transverse rows in which each article is spaced from an adjacent article, and a plurality of curved retaining strips concentric with the sprocket at the other end of said conveyor and spaced therefrom to cooperate with the articles carried on said conveyor to retain the articles in position as they move downwardly around said last mentioned end, said retaining strips being spaced one from the other and positioned in substantial longitudinal alignment with said peaks.

4. An apparatus of the character described comprising an endless main conveyor, a transfer pusher bar at one end of said conveyor provided with means adapted to transfer articles to said main conveyor in transverse rows in which the articles comprising the row are spaced relative to each other, and curved retaining strips at the other end of said conveyor and adapted to cooperate with the articles as they move around said last mentioned end, said strips being spaced relative to each other and related to said pusher bar in such manner that the spacing between said strips is in substantial alignment with the center of each respective article positioned on said conveyor by said pusher bar.

FRANK P. PERKINS.